July 30, 1940.  F. L. SESSIONS  2,209,637
APPARATUS FOR ELECTRIC INDUCTION WELDING AND HEATING
Filed July 11, 1929  2 Sheets-Sheet 1
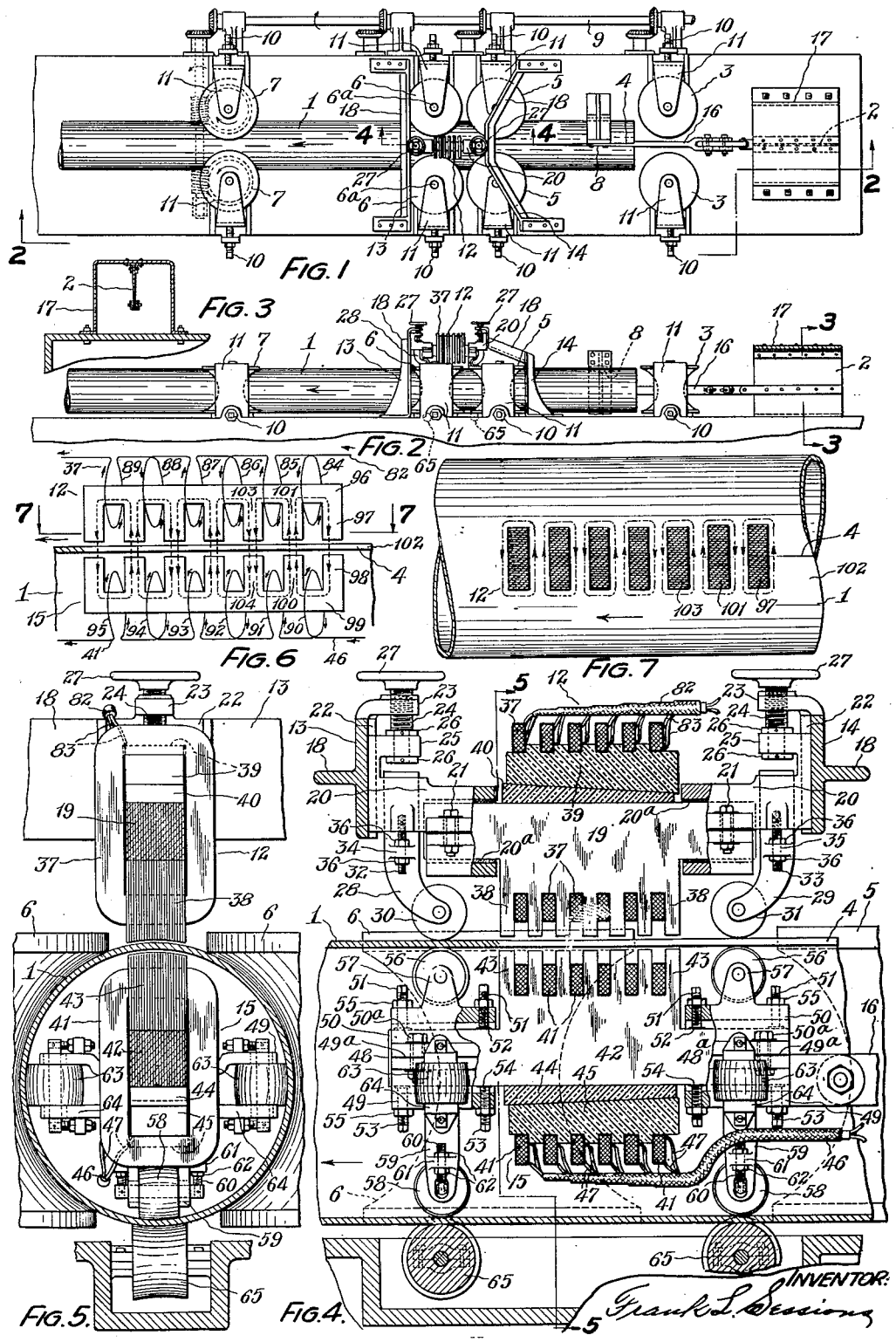

July 30, 1940.   F. L. SESSIONS   2,209,637
APPARATUS FOR ELECTRIC INDUCTION WELDING AND HEATING
Filed July 11, 1929   2 Sheets-Sheet 2
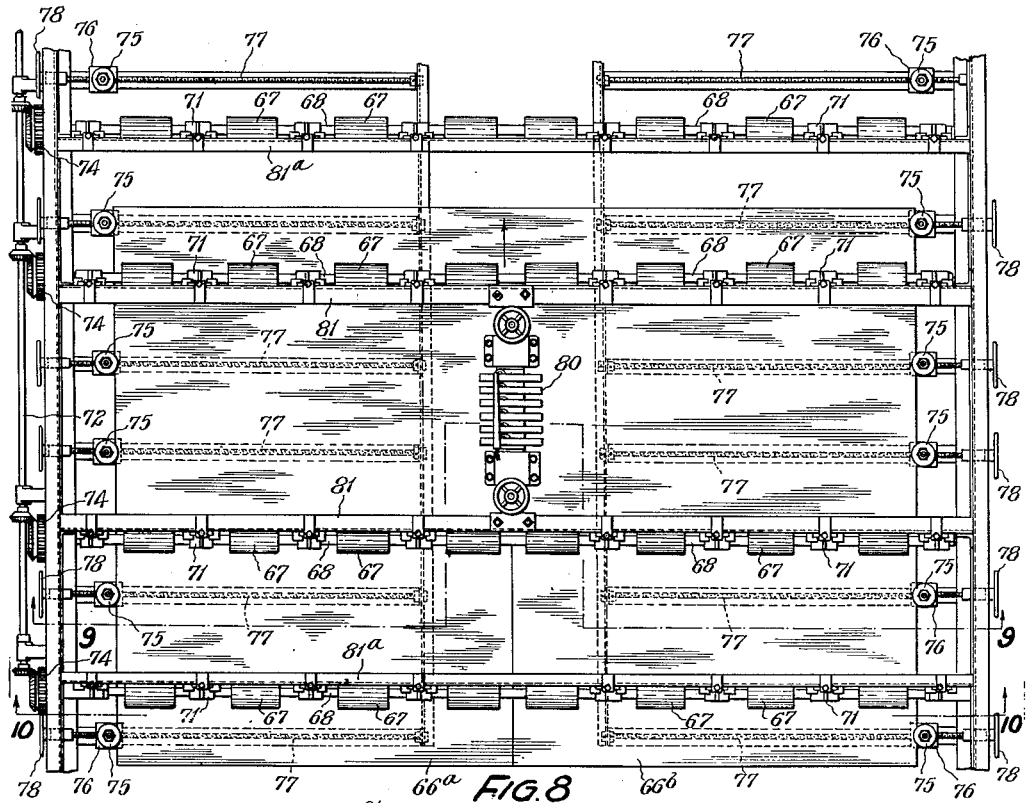
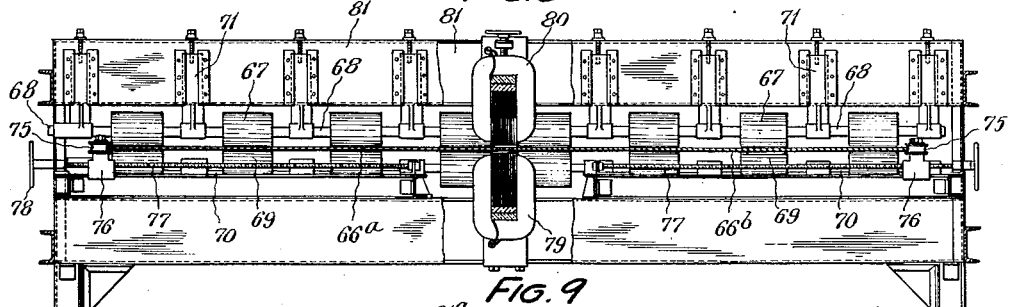
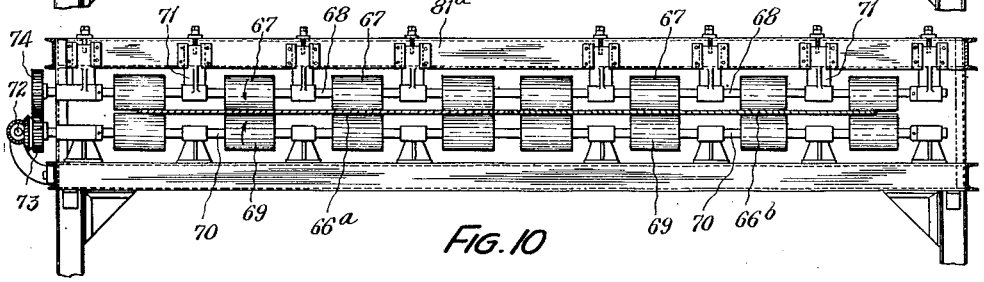
INVENTOR:
Frank L. Sessions Patented July 30, 1940

2,209,637

UNITED STATES PATENT OFFICE 2,209,637

APPARATUS FOR ELECTRIC INDUCTION WELDING AND HEATING

Frank L. Sessions, Lakewood, Ohio

Application July 11, 1929, Serial No. 377,423

9 Claims. (Cl. 219—6)

My invention relates to improved apparatus which is particularly adaptable to carrying out the electric induction welding processes disclosed in my United States Patents No. 1,365,198 and No. 1,365,199. By these processes the edges of an open seam in metal may be heated to welding temperature by electric currents induced in and made to flow across the seam to be welded by means of one or more alternating magnetic fields of force, the magnetic lines of which are caused to pass through the metal to be welded.

Among the objects of my invention are:

The provision of apparatus for continuously and progressively welding a butted seam in tube or pipe of any desired length.

The provision of apparatus for continuously and progressively welding together the edges of sheets or plates of any length.

The provision of means for inducing electric welding current to flow across an open seam in metal comprising a series of alternately oppositely wound coils surrounding a magnetic core and spaced apart by magnetic pole pieces supported adjacent to one surface and a similar set of coils, core and pole pieces supported adjacent to the opposite surface of the metal in which the seam is located in such a manner that the pole pieces on one side are in alignment with and of opposite polarity to those on the other side of the work.

The provision of means for heating metal by inducing electric currents to flow therein and varying or regulating the rate of heating by varying the air gap in the magnetic circuit of the magnetic field which cuts the metal, the air gap being the space between relatively movable magnetic members other than the metal being heated and variable by moving one of said members toward or away from the other, or, in other words, varying the reluctance of the magnetic circuit to vary the current induced in the metal.

The provision of means for varying the air gap between the work and the pole pieces of the magnetic circuit to vary the current induced in the work.

The provision of an inducing element adapted to be held in position inside of a tube or pipe.

The provision of means for supporting and retaining an inducing element in proper position inside a tube or pipe.

The provision of roller means adapted to roll on the surface of the work to support and position an inducing element or magnetic member and to definitely locate said inducing element or magnetic member to maintain constant the desired reluctance of the magnetic circuit by maintaining a constant length of air gap.

The provision of a machine for welding together the edges of an open seam in metal by the electric induction method in which the work to be welded moves through the machine continuously in a direction parallel to said seam.

The provision of apparatus for welding together the edges of an open seam in metal in which the magnetic lines of force which set up the heating current in the work pass from a magnetic pole of one polarity on one side of the work through the work to another magnetic pole of the opposite polarity on the opposite side of the work.

The provision of means for reducing the weld bur while hot.

The provision of means for rolling the metal at the seam by the same rollers that support the inducing elements.

The provision of means for inducing electric current of large volume to flow in and heat a metal article comprising means for exciting rapidly alternating magnetic fields of force adjacent both sides of the article to cause magnetic lines of force to pass through the article, the magnetic fields of force being so disposed and of such frequency that the magneto-motive forces due to the exciting means on one side of the article assist those due to the exciting means on the other side of the article to cause magnetic lines of force to "cut" the article and generate electro-motive forces in it.

The provision of means for reducing the magnetic leakage consisting of energized induction coil means supported on opposite sides of the work in definite relation to the opposite surfaces of the work, with the induction coil means on one side of the work opposite the induction coil means on the other side of the work and preferably coextensive longitudinally in a direction parallel to the direction of movement of the work.

The provision of means for causing progressive relative movement of the article and the fields of force.

In the drawings:

Fig. 1 is a plan view of a machine embodying my invention.

Fig. 2 is a side elevation of the machine shown in Fig. 1, partly shown in section on line 2,2 of Fig. 1.

Fig. 3 is a vertical cross section on line 3,3 of Fig. 2 showing a thin anchor bar supporting plate.

Fig. 4 is an enlarged vertical longitudinal section taken on line 4,4 of Fig. 1.

Fig. 5 is a vertical cross section taken on line 5,5 of Fig. 4.

Fig. 6 is a diagrammatic, vertical, sectional view showing coils, core and pole pieces with direction of current and magnetic flux indicated thereon.

Fig. 7 is a diagrammatic plan section taken on line 7,7, of Fig. 6 and showing the paths of the currents induced in the work.

Fig. 8 is a plan view of a machine embodying my invention and adapted to weld the edges of flat plates or sheets.

Fig. 9 is a vertical cross section on line 9,9 of Fig. 8.

Fig. 10 is a vertical cross section taken on line 10,10 of Fig. 8.

Referring to the drawings, Figs. 1, 2, 3, 4, and 5 show my invention adapted to the welding of pipes or tubes of comparatively large diameters. The pipe 1 may be pre-formed by any desired means provided only that the seam edges are so shaped as to be capable of being butted together in a manner suitable for welding. The pipe 1 is first passed over the elongated thin depending plate anchor bar support 2 and engaged by the first pair of feed rolls 3,3. The depending plate 2 extends down into the pipe 1 through the open seam 4, the edges of which are engaged and guided by the plate 2. The four pairs of rolls 3,3, 5,5, 6,6, and 7,7 carry the pipe 1 through the machine in a direction parallel to its seam. A seam guide 8 of any convenient form may be provided which serves to align the open seam 4 so that it will pass through the pressure rolls 5,5 and 6,6 and the welding apparatus in the proper position. As shown in the drawings, the seam guide 8 comprises a relatively thin fin or blade supported in a bracket and projecting downwardly into the open seam 4 of the pipe 1, but any other suitable type of seam guide may be used.

The four sets of rolls 3,3, 5,5, 6,6 and 7,7 are all driven from the drive shaft 9 through suitable gears and all rotate in a direction tending to feed the pipe 1 through the machine in the direction of the arrow. Shaft 9 may be driven by any convenient driving connections from a source of power.

The position of the axes of the individual rolls of each pair of rolls 3,3, 5,5, 6,6 and 7,7 which are revolubly mounted in sliding brackets 11, may be adjusted towards or from the axis of the pipe 1 by the screws 10 to give any desired pressure on the pipe to propel it through the machine. Rolls 3,3 aid in feeding the unwelded pipe 1 into the machine and rolls 7,7 carry it out of the machine after the welding operation is complete. The vertical shafts 6a,6a on which rolls 6,6 are mounted, may be positioned approximately in line with the point at which the edge surfaces of the seam 4 reach their highest temperature. Thus rolls 6,6, in addition to aiding in feeding the pipe through the machine, are adapted to exert the pressure necessary to complete the welding together of the heated edges of the seam 4. Rolls 5,5 are located near the front end of the magnetic cores (the end which the pipe approaches) and rolls 6,6 are located near the rear end of the magnetic cores (the end from which the pipe moves away). Rolls 5,5 and 6,6 coact to give the desired spacing or pressure between the opposite edges of the seam and to bring the edges together at the desired point in relation to the magnetic field, or fields. Rolls 6,6 function also in the formation of a welding throat where the final welding pressure or weld take-up is exerted on the tube by the pressure of the rolls on a major portion of the entire outer periphery of the tube. The adjustment of rolls 6,6 is such that the size of the welding throat may be varied to produce any required take-up of the heated edges at the point of application of the final welding pressure. It is generally preferable that the rolls forming the welding throat encompass as much of the outer periphery of the pipe as possible as this permits the exertion of the proper welding pressure without undue distortion of the pipe at unsupported points. For this reason I prefer to locate a roll 65 and a roll 30 close enough to the plane of the axes of rolls 6,6 to properly support the tube in the welding throat thus formed. The rolls 65 and 30 thus forming part of the welding throat permit the rolls 6,6 to encompass considerably less than the entire circumference of the tube and thus to have smaller outside diameters than would otherwise be necessary. The resultant force or pressure on the tube as it passes through the welding throat is in a circumferential direction so that the edges of the tube are pressed together by a progressive, continuous, substantially uniform or constant, welding pressure as the tube moves progressively along through the welding throat. A very light pressure between the seam edges will result in flashing away of the contacting points of the seam edges in the manner of a flash type of electric resistance weld. A heavy pressure will tend to prevent the flashing and result in an upset type of electric resistance weld. It is possible by properly adjusting the pressure between the seam edges to obtain any desired modification of these well known types of resistance welds. It is, however, essential that the apparatus be capable of maintaining constant the desired pressure, or space, between the seam edges in order to maintain uniform welding conditions until it is purposely desired to vary the space, or pressure, to change the welding conditions or to compensate for changes in the characteristics of the work being welded.

The external inducing unit 12 is held in position above the seam by the supporting members 13 and 14. The internal inducing unit 15 is held in its longitudinally proper place inside the tube by a longitudinally disposed supporting member or adjustable anchor bar 16 which is supported at its outer end by the elongated, thin, depending-plate, anchor-bar support 2. This plate-shaped member 2 is preferably supported by an inverted U-shaped frame 17 as is best shown in Fig. 3.

Figs. 4 and 5 are enlarged detailed views showing the external and internal inducing units 12 and 15. The external unit is adjustably mounted on the cross members 18 of the supporting members 13 and 14. The laminated core 19 is clamped in the preferably non-magnetic, vertically adjustable members 20 by means of the insulated bolts 21. The clamps 20, may be insulated from the core 19 by suitable insulation 20a. The members 20 are adapted to slide vertically in guides 22 which are provided on cross members 18. Cross members 18 have horizontally extending ears 23 in which are threaded holes for adjusting screws 24. The lower ends of adjusting screws 24 are not threaded but are rotatably mounted in holes in the ears 25 of the vertically adjustable members 20. Screws 24 are adapted to turn freely in the holes in ears 25 but are prevented from moving axially relative thereto by the thrust collars 26, which are held in their proper position on the lower ends of screws 24 by suitable pins. Hand wheels 27 are mounted on the upper ends of screws 24 for vertically adjusting the inducing unit.

The roller supporting members 28 and 29 support the rolls 30 and 31 in depending forked portions. The upper ends of members 28 and 29 are slidably but non-rotatably mounted in holes in the vertically adjustable members 20. Threaded studs 32 and 33 are fastened in projections on the members 28 and extend downwardly passing through unthreaded holes in lugs 34 and 35 on roller supporting members 28 and 29 respectively. Members 28 and 29, together with rolls 30 and 31, may be adjusted vertically relative to supporting members 20 by changing the position of the lock nuts 36 on screws 32 and 33. The clearance or air gap between the pole pieces 38 of core 19, and the work (pipe) 1, may be set or altered by such adjustments. The coils 37 surround the laminated core 19 and pass between the tooth-like pole pieces 38. They are spaced apart at the top of the non-magnetic spacing rack 39, the bottom surface of which is adapted to coact with the non-magnetic wedge member 40 to hold the coils firmly in place on the core 19. The inducing current is brought to the coils 37 by means of the cable 82 and conductors 83. Preferably the height of the opening in the coils 37 will be sufficient to admit the core 19 with its pole 38 in assembling the inducing unit.

By means of the above described construction the external inducing unit is adjustably supported above the work to be welded in such a way that the entire inducing unit may be moved toward or away from the work and the rolls 30 and 31 may be set to provide any desired air gap between the ends of the pole pieces 38 and the work when the rolls 30 and 31 are rolling upon the work. To lift the entire unit from the work to permit larger pipe or thicker plates to pass through the machine the hand wheels 27 are rotated in the proper direction to cause the screws 24 to lift the inducing unit while the reverse movement will lower it. If it is desired to change the air gap between the pole pieces 38 and the work, the nuts 36 are loosened on the screws 32 and 33, the screws 24 are rotated to position the pole pieces 38 the desired distance from the work, and the nuts 36 are again tightened to cause the rolls 30 to bear upon the work with the desired pressure. When the work is moving to the left as seen in Fig. 4, the roll 30 may be employed to roll down the red hot bur that may form at the welded seam. The magnetic pull of the external poles 38 toward the internal poles 43 of the internal inducing unit may be utilized to augment the pressure of the rolls 30, 31 and 56, 56 upon the work.

The internal inducing unit 15 is similar to the external inducing unit 12 except for its means of support. Coils 41 surround the core 42 and are spaced apart on top by the tooth-like pole pieces 43. The non-magnetic wedge 44 and spacing rack 45 coact to hold the coils firmly in place on the core 42. The cable 46 and conductors 47 carry the primary current to the coils 41. The ends 48 and 48a of the laminated core 42 are adjustably mounted in the split, roll-supporting brackets 49 and 50. Extending down through the top of the roll-supporting brackets 50 are screws 51 which are insulated from the ends 48 and 48a of the core 42 by the insulating discs 52. Screws 53 extend up through the bottoms of the roll-supporting brackets 49 and are insulated from the ends 48 and 48a of core 42 by the insulating discs 54. The members 49, 50 of the pairs of roll-supporting brackets, are preferably insulated from each other by insulation 49a and firmly secured together by bolts 50a which are preferably insulated from the parts 49 and 50. As the core-receiving aperture in the split bracket composed of roll-supporting members 49 and 50 is larger in a vertical direction than the ends 48 and 48a of the core 42 it will be evident that by adjusting the screws 51 and 53 the core 42 may be raised or lowered relative to the roll-supporting bracket members 49 and 50. Lock nuts 55 may be provided on screws 51 and 53 to hold them in any desired position. The upper vertical rolls 56 are mounted on shafts which are supported by upwardly extending arms 57 on the upper portion 50 of the roll-supporting bracket. The air gap between the pole pieces 43 and the work 1 is controlled by the vertical distance between the top surfaces of pole pieces 43 and the top of rolls 56. This distance may be regulated by the adjusting screws 51 and 53 which are adapted to raise or lower core 42 and pole pieces 43 relative to the split roll-supporting brackets composed of members 49 and 50 on which brackets are mounted rolls 56.

The lower supporting rolls 58 for the inducing unit 15 are adjustably mounted in forked members 59 which extend upwardly and are integral with the lower roll-supporting members 49. The shafts on which rolls 58 are mounted extend out through slots in the forked members 59. Adjusting screws 60 are attached to these shafts and extend upwardly passing through holes in ears 61 on fork members 59. Adjusting nuts 62 serve to raise or lower the screws 60 relative to the ears 61. As the roll shafts are attached to screws 60 the rolls 58 will be raised or lowered when the adjusting nuts 62 are turned.

The horizontal guiding rolls 63 are adjustably mounted in horizontally extending forked members 64 which are also integral with the roll-supporting brackets 49. The horizontal rolls 63 are mounted in the same manner as the vertical rolls 58 and are adjusted by similar means.

The entire internal inducing unit 15 is held in position inside the pipe 1 by the longitudinally disposed supporting member or anchor bar 16. The length of this anchor bar 16 may be adjusted to aid in locating the internal inducing unit in its proper position longitudinally of the pipe. The anchor bar 16 is so constructed as to permit of small lateral movements of the internal inducing unit but no longitudinal movement except by intentional adjustment of the length of the anchor bar 16 in known manner, as for instance, by means of a turn-buckle.

Work-supporting rolls 65 may be mounted in the base of the machine directly below the rolls 58. Rolls 65 thus support the weight of the internal inducing unit which is transmitted to them from the rolls 58 through the pipe 1. Rolls 65 also co-act with rolls 58 to support the internal core or inducing unit when no tube is passing this point. The rolls 65, particularly the one at the left hand end as seen in Fig. 4, thus serve to limit the downward movement of the internal magnetic core when tubing is not being fed past this internal core or inducing unit. The vertical rolls 58 and the horizontal rolls 63 are made adjustable to take care of slight variations in the size of the pipe which is being welded. They serve to support the internal inducing unit 15 and hold it in its proper position relative to the seam to be welded and to the external inducing unit 12. The upper vertical rolls 56 are not made adjustable as the vertical distance between rolls 56 and 58 may be regulated by the adjustment of lower vertical rolls 58. The form and position and number of rollers comprising the roller means for supporting and positioning the internal magnetic core may be varied considerably depending on the type of core used, the position of the seam being welded (at the top or at the bottom or in an intermediate position), the position and type of external core or cores used, and other features, as will be readily understood by those skilled in the art.

The rolls 56, 58 and 63 which are located near the end of the magnetic core 42 which the tube approaches (the rolls shown at the right hand side of Fig. 4), engage the inside surface of the pipe or tube at a sufficient number of circumferentially spaced points to prevent inward collapse of the tube. The seam edges are unwelded at this point and it is usually desirable to maintain a definite, substantially constant, spacing or pressure between the opposite edges of the seam while the tube is approaching and passing through the zone where the induced current flows across the seam. These rolls accomplish this purpose by preventing the seam edges coming closer together than the desired, predetermined amount. They may, in fact, be used to spread the seam edges apart the desired distance if they have been pressed too closely together by the feed rolls 5, 5. The adjustments provided for the rolls 58 and 63 may be utilized to vary the spacing between the unwelded edges of the seam at this point. The internal rolls 56, 58 and 63 which are located near the rear end of the internal magnetic core 42 are preferably positioned in a vertical transverse plane which is located so that it cuts the external rolls which form the welding throat. In this way these internal rollers serve not only to maintain the internal induction coil means and/or the internal magnetic core in the definite, desired relationship with the inside surface of the pipe, but also serve to effectively prevent undue inward collapse of the tube and overlapping or slipping past one another of the abutting seam edges when the tube is being compressed in its passage through the welding throat, without causing prohibitively large resistance to the progressive, longitudinal movement of the tube. I prefer to employ internal rollers 56, or similar rollers, adapted to contact with the inside surface of the tube on each side of the seam and to employ external rollers or roll means such as rolls 30 and/or 31, engaging the outside surface of the tube on each side of the seam opposite the internal roller means, as a positive help in preventing overlapping of the seam edges.

Figs. 8, 9 and 10 show a modification of my invention which is adapted to weld the edges of sheets or plates. The plates 66a and 66b which are to be welded pass through the machine in the direction of the arrow. Top feed rolls 67 are mounted on shafts 68 and bottom feed rolls 69 are mounted on shafts 70. Rolls 67 are preferably positioned directly above rolls 69 and shafts 68 are vertically adjustable by means of the vertically adjustable bearings 71. Any desired number of sets of top and bottom roll shafts 68 and 70 and rolls 67 and 69 may be provided, four sets being shown in the drawings. A drive shaft 72 extends along one side of the machine and drives the lower roll shafts 70 through bevel gears. Long tooth spur gears 73 are mounted on the ends of shafts 70 and mesh with long tooth spur gears 74 which are mounted on the ends of the corresponding upper roll shafts 68. Thus rolls 67 and 69 are rotated in opposite directions and will coact to feed the plates 66a and 66b through the machine in the proper direction.

The adjustable grooved side pressure rolls 75 are adapted to exert pressure on the outer edges of the plates 66a and 66b and force their inner edges together so that the welding current may flow across the seam and heat the edges to the proper welding temperature. They also serve to force the heated seam edges together with the proper pressure to cause them to become welded. These side pressure rolls 75 are rotatably mounted on blocks 76 through which pass the adjusting screws 77. Hand wheels 78 may be provided on the outer ends of adjusting screws 77 to facilitate the positioning of rolls 75.

The lower inducing unit 79 may be similar to the internal inducing unit 15 of the pipe welding machine above described but is preferably rigidly mounted in a fixed position on suitable supports. The upper inducing unit 80 may be similar to the external inducing unit 12 of the above described pipe welding machine and may be supported in the same adjustable manner above the work. Beams 81 extend across the machine perpendicular to the direction of travel of the plates 66a and 66b and serve to support the inducing unit 80 and also the vertically adjustable bearings 71 of two of the upper feed roll shafts 68. Smaller beams 81a support the bearings 71 of the other two upper feed-roll shafts.

It will be understood that if an unseamed metal plate or strip or a stack of plates or strips having a width approximately or somewhat greater than that of the pole faces of the inducing units as measured transversely to the direction of movement of the work be traversed through the apparatus shown in Figs. 8, 9 and 10 and above described, electric currents will be induced in such work and that my invention may be employed to heat the work, not for welding but for other purposes such as annealing, rolling or other purpose.

Fig. 6 is a diagrammatic view showing how the coils of the inducing units are wound and the direction of the current flow in them. It also shows by dotted lines and arrow-heads the direction and paths of the lines of force set up by the flow of current in the inducing coils. Of the upper inducing coils, 84, 86 and 88 are wound in one direction and 85, 87 and 89 are wound in the opposite direction. Likewise, in the lower inducing unit coils 90, 92 and 94 are wound in one direction and 91, 93 and 95 in the opposite direction.

The coils of each inducing unit are shown connected in series but it will be understood that they may be connected in any desired manner as to series or parallel relation. For clearness, the coils are shown in Fig. 6 as being made up of only one turn of wire each but it will be evident to those skilled in the art that the number of turns required in each coil depends upon various factors such as voltage and frequency of the current, kind and characteristics of work metal, thickness of the work, work speed, etc.

An alternating current passing through coils 84 and 90 in the directions indicated by the arrows will set up lines of force which will pass through the core 96, pole pieces 97 and 98, core 99 and pole pieces 100 and 101. The path of these lines of force is indicated on the pole pieces and cores in Fig. 6 by dotted lines and arrowheads. As the lines of force pass through the air gaps between pole pieces 97 and 98 and 100 and 101 they pass also through the work 102. The work 102 is shown in Fig. 6 as a pipe but it will be understood that currents will be induced in the work whether it be a pipe, a flat plate or strip or a stack of plates or strips that is passed between the pole pieces of the upper and lower inducing units. In like manner the alternating current flowing in coils 85 and 91 will cause lines of force to flow through the core 99, pole pieces 100 and 101, core 96 and pole pieces 103 and 104 in the direction indicated by the arrow-heads on them in Fig. 6. As coils 85 and 91 are wound in the opposite direction to coils 84 and 90 the lines of force set up by the coils 85 and 91 will travel in a direction opposite to that of the lines of force set up by coils 84 and 90. Thus it will be seen that all the lines of force passing through pole pieces 100 and 101 will be flowing in the same direction. Each of the other coils shown will set up lines of force which will pass through the cores and pole pieces in directions indicated by the respective dotted lines and arrow-heads. It will be seen from Fig. 6 that the lines of force flowing from pole piece 100 to pole piece 101 pass upwardly through the work 102, while the lines of force flowing from pole piece 103 to pole piece 104 pass downwardly through the work 102. In like manner the lines of force flowing between each adjacent pair of opposite pole pieces pass through the work in opposite directions.

As the lines of force which pass from pole piece 100 to pole piece 101 pass through the work 102 they induce currents in the work which flow in a path around the projections of the ends of the pole pieces 100 and 101 on the work 102. In similar manner currents will be induced by the lines of force passing from pole piece 103 to pole piece 104 but these currents will flow in a direction opposite to those set up around pole pieces 100 and 101. As shown diagrammatically by the arrows in Fig. 7, currents will flow in the work around the areas that are between the ends of each pair of opposite pole pieces and the currents induced by adjacent pairs of opposite poles while flowing in opposite directions around such areas will flow in the same direction along their contiguous sides. These induced currents flow across the seam to be welded as indicated by the arrows in Fig. 7 and as the resistance of the seam is greater than that of the surrounding metal the greatest heat developed from the flow of current will be produced at the seam. When heating or welding pipe or tubing, there will be induced circumferentially flowing currents in the metal between the poles, and as the spacing or distance between any two poles is increased, the relative importance of the heating effect of the circumferential currents is also increased. As the work to be welded passes through the successive magnetic fields set up by the inducing coils the currents induced in the work will produce a cumulative heating effect which, it will be understood, may be so correlated to the speed of travel of the work that the seam edges will reach the welding temperature at approximately the time the work 102 leaves the last magnetic field. In welding pipe, the pressure rolls 6,6 in Fig. 1 may be adjusted to secure the proper pressure to cause the welding of the seam edges to be completed at substantially the time they reach the welding temperature and pass between the last pair of opposite pole pieces.

In the apparatus illustrated in Figs. 8, 9 and 10 for welding together the edges of flat plates, welding pressure is obtained by means of the adjustable grooved side pressure rolls 75.

It will be evident to those skilled in the art that any suitable number of inducing coils such as those shown at 37 and 41 in Fig. 4 and intervening poles may be used and I do not limit my invention to the specific number shown in the drawings. The heat developed in the work will depend on the thickness of its metal, the strength and frequency of the current induced in the work, the electrical resistance of the work, and the length of time the metal of the work is subjected to the heating effect of such current. It will be understood that the speed of travel of the work relative to the inducing coils and pole pieces determines this time factor. Those skilled in the art will understand that for some purposes a small number of inducing coils carrying a large current will give the best results, while for others a larger number of coils and a smaller inducing current may be better. By employing such energized induction coils on opposite sides of the work, or on the inside and the outside of a tube, with the induction coil means on one side of the work positioned opposite the induction coil means on the other side of the work, magnetic leakage is reduced, particularly if the induction coil means on one side of the work is directly opposite and coextensive longitudinally in a direction parallel to the axis of the pipe or tube with the induction coil means on the other side of the work, as shown in Fig. 4.

The pitch of the poles, i. e., the distance from the center of one pole to the center of the next as measured in the direction of movement of the work, preferably is to be made as small as possible without too greatly increasing the magnetic leakage between the poles. Obviously the thickness of the work and the length of the air gap between opposite poles in a measure determine the pitch of the poles as will be understood by those skilled in the art. By making the distance between the pole centers short the zones of maximum current flow, which zones are between the poles, will be close together and the time required for a given point on the work to pass from one zone of maximum current flow to the next will be so short that the heat developed in the metal of the work while the point is passing through one such zone will not be too greatly dissipated before it enters the next zone.

It will be understood by those skilled in the art that the magnetic cores and poles must be of sufficient cross section to carry the requisite number of magnetic lines of force, and the coils must have the requisite number of turns and have passed through them the requisite energizing current of such frequency as to induce such electro-motive forces in the work that the resulting currents will develop the requisite heat to raise the work to the desired temperature.

The laminated core members 19 and 42 together with their tooth-like pole pieces 38 and 43 serve to aid the magnetic lines of force set up by the coils 37 and 41 to pass through the path of movement of the work. These lines of force will in general follow the paths shown in dotted lines in the diagrammatic view Fig. 6. As the ends of pole pieces 38 and 43 may be brought into close proximity with the work the air gaps between the opposite pole pieces will be small and the magnetic field which passes through the work will be much stronger than it would be if these pole pieces were not provided.

The current induced in the work is determined by the voltage developed in it which in turn depends upon the number of lines of force that "cut" the work per unit of time. It will be understood therefore that the cross sectional dimensions and area of the pole pieces and the frequency of the inducing current may be selected to produce the results desired.

I do not limit myself to the specific apparatus shown in the drawings and described in this specification as it will be evident to those skilled in the art that modifications may be made without departing from the scope of my invention. It will be understood that my invention may be utilized to heat articles or substances which are conductors of electricity for any desired purpose, is not limited to welding but may be used for annealing, rolling, smelting or any other purpose for which it may be employed.

The apparatus shown in the drawings has a series of poles, but I do not so limit myself, as certain broad features of my invention such as the roller supporting means for a magnetic member or inducing unit and the means for adjusting and varying the air gap of the magnetic circuit, may be utilized to equal advantage with only one pole or with a plurality of poles, i. e., two or more poles. These features may also be utilized in the heating or welding of tubes or cylinders with apparatus in which a large portion of the heating is accomplished by circumferentially flowing currents.

I have shown in the drawings and pointed out advantages of apparatus having induction coils on both sides of the work, but it will be understood by those skilled in the art that many of the features of my invention may be usefully employed in combination with induction heating or welding apparatus in which the induction coil means for setting up the required magnetic field is positioned on only one side of the work, or positioned to surround a tube.

I claim:

1. Apparatus for welding a seam in metal comprising means for progressively feeding the work in a direction parallel to the seam to be welded, a series of successively oppositely wound electric conductor coils disposed on one side of said work, a magnetic core extending through said coils, pole pieces between said coils extending from said core into close proximity with the seam to be welded, the series of pole pieces extending longitudinally thereof, a series of successively oppositely wound electric conductor coils disposed on the opposite side of said work from said first named series of coils, a magnetic core extending through said second named coils, pole pieces between said oppositely wound coils extending from said second named core into close proximity with the seam to be welded but on the opposite side of said work from said first named pole pieces, said second named pole pieces being disposed so that their ends are directly opposite the ends of said first named pole pieces, means for causing alternating electric current to flow through said first and second named coils and means for exerting welding pressure on the edges of the seam to be welded.

2. Apparatus for heating metal by inducing electric current in it, comprising a series of electric conductor coils disposed in axial alignment on one side of the metal to be heated, said coils being axially spaced and in close proximity to said metal, a second series of electric conductor coils disposed in axial alignment on the opposite side of said metal from said first named series of coils, the coils of said second series being axially spaced and in close proximity to said metal, and means for causing alternating electric currents to flow through said first and second named series of coils, to oppositely energize adjacent coils of a series, the coils of said first named series being disposed parallel to and directly opposite the coils of said second named series and adapted to be so energized that the magneto-motive-forces of the coils of the first named series assist the magneto-motive-forces of the oppositely disposed coils of the second named series.

3. Apparatus for heating metal by inducing electric current in it comprising a series of axially spaced electric conductor coils disposed on one side of the metal to be heated, a magnetic core extending through said coils, pole pieces between said coils extending from said core into close proximity to said metal to be heated, a second series of axially spaced electric conductor coils disposed on the opposite side of said metal to be heated from said first named series of coils, a magnetic core extending through said second named series of coils, pole pieces between the coils of said second named series extending from said second named magnetic core into close proximity to said metal to be heated but on the opposite side of said metal from said first named pole pieces, said second named pole pieces being disposed with their faces opposite the faces of said first named pole pieces, and means for causing alternating electric current to flow through said first and second named series of coils to oppositely energize adjacent coils of a series.

4. In apparatus for welding the contacting surfaces of an open seam in metal by causing electric current induced in the metal to flow across said seam to heat the seam surfaces of the metal to welding temperature, an induction unit comprising a series of spaced, successively oppositely energized, magnetic poles, means supporting said poles with their ends in close proximity to said seam, said means including a roller adapted to roll along the weld burr while the burr is hot as it comes from the welding zone, a magnetic member, means supporting said magnetic member adjacent to the opposite side of said metal from that to which said poles are presented, said magnetic member constituting an armature for said poles but being spaced therefrom to permit said metal to pass therebetween, means for causing relative traversing movement of said metal and said poles, and alternating current means for energizing said poles.

5. Apparatus for electrical induction welding and heating comprising a source of supply of alternating electric current, a plurality of axially spaced and aligned electric conductor coils disposed on one side of the work which is to be welded or heated, a plurality of axially spaced and aligned electric conductor coils disposed on the opposite side of said work which is to be welded or heated, the axes of said coils being substantially parallel, means connecting said source of supply of alternating current to said coils to oppositely energize adjacent coils, a magnetic core disposed in said first named coils, a magnetic core disposed in said second named coils, each of said magnetic cores having pole pieces extending between the coils into close proximity to said work, said pole pieces being so placed that the faces of the pole pieces on one side of said work are opposite the faces of the pole pieces on the other side of said work, means for varying the air gap between said oppositely disposed pole faces and means for causing relative traversing movement between said pole faces and said work.

6. Apparatus for electric induction welding of seams in metal comprising an inducing element disposed on one side of said metal and having a magnetic pole piece extending into close proximity with said seam and an electric conductor coil adapted to set up lines of magnetic force in said pole piece when energized by alternating electric current, a second inducing element disposed on the opposite side of said metal and having a magnetic pole piece extending into close proximity with said seam directly opposite said first named pole piece and an electric conductor coil adapted to set up lines of magnetic force in said second named pole piece when energized by alternating electric current, said first named and said second named coils being so wound that the lines of magnetic force set up by them will pass from one of said pole pieces through the work metal to the other of said pole pieces, a source of supply of alternating electric current, means for feeding said metal with said seam to be welded between said pole pieces, and means for exerting welding pressure on said metal.

7. Apparatus for heating metal by inducing electric currents to flow therein comprising an inducing element disposed on one side of the metal to be heated and having a magnetic pole piece extending into close proximity with said metal and an electric conductor coil adapted to set up lines of magnetic force in said pole piece when energized by electric current, a second inducing element disposed on the opposite side of the work and having a magnetic pole piece extending into close proximity with said work directly opposite said first named pole piece and an electric conductor coil adapted to set up lines of magnetic force in said second named pole piece when energized by electric current, said first named and said second named coils being so wound that the lines of magnetic force set up by them will pass from one of said pole pieces through the work metal to the other of said pole pieces, a source of supply of electric current and means for causing relative traversing movement of said work to be heated and said pole pieces.

8. In apparatus for electric induction welding, inducing means supported on one side of the work and separate inducing means supported on the other side of the work for inducing a plurality of fields of rapidly alternating magnetic force of successively opposite directions, means for directing said successively opposite fields of magnetic force so that they pass through said work, said inducing means being energized to cause the magnetomotive forces of the inducing means which is supported on one side of the work to augment the magnetomotive forces of the inducing means which is supported on the other side of the work to cause the magnetic fields to pass through the work, means for causing relative traversing movement between said work and said fields of magnetic force, and means for exerting welding pressure on said work.

9. In apparatus for electric induction welding or heating, an energized inducing unit supported on one side of the work, a separate, energized inducing unit supported on the opposite side of the work, said inducing units being disposed to cause their magnetic fields to pass magnetically in series from said first named inducing unit through said work to said second named inducing unit to cause heating currents to be induced in the work.

FRANK L. SESSIONS.